Figure 1:
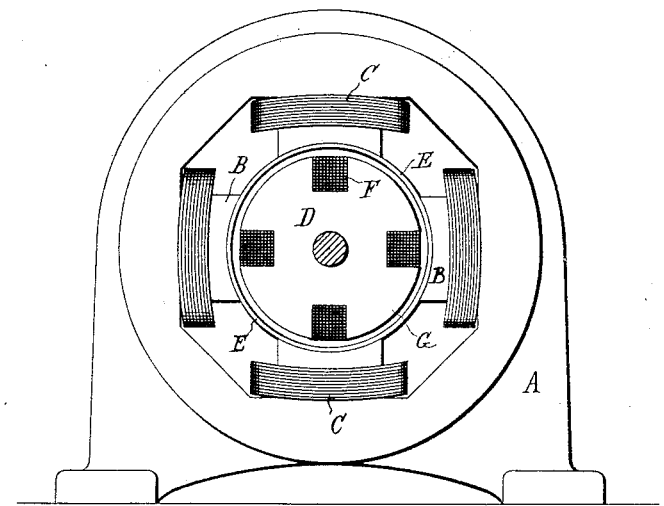

(No Model.)

W. STANLEY, Jr. & J. F. KELLY.
ELECTRIC GENERATOR AND MOTOR.

No. 500,301. Patented June 27, 1893.

Witnesses:
Raphaël Netter
James Catlow

Inventors
William Stanley Jr.
and John F. Kelly
by Duncan & Page,
Attorneys.

UNITED STATES PATENT OFFICE.

WILLIAM STANLEY, JR., AND JOHN F. KELLY, OF PITTSFIELD, MASSACHUSETTS, ASSIGNORS TO THE STANLEY LABORATORY COMPANY, OF SAME PLACE.

ELECTRIC GENERATOR AND MOTOR.

SPECIFICATION forming part of Letters Patent No. 500,301, dated June 27, 1893.

Application filed January 9, 1893. Serial No. 457,706. (No model.)

*To all whom it may concern:*

Be it known that we, WILLIAM STANLEY, Jr., and JOHN F. KELLY, citizens of the United States, residing at Pittsfield, in the county of Berkshire and State of Massachusetts, have invented certain new and useful Improvements in Electric Generators and Motors, of which the following is a specification, reference being had to the drawings accompanying and forming a part of the same.

When an armature with teeth or polar projections is employed in a generator or motor, the current in the field coils, when the armature is in rotation, is subject to variations, frequently quite marked, caused by the variation of the magnetic reluctance between the field magnets and through the armature core. These variations in the current are directly due to a varying magnetic flux, so that when this disturbing cause is present or operative the out-put of the machine is reduced on account of the heating caused by Foucault currents and hysteresis, and, in the case of machines producing or operated by currents of rising and falling potential, the shape of the waves of electro-motive force is affected, as these are due partly to the motion through the field and partly to the change in intensity of the field. We have devised a plan for remedying this objection, by placing short-circuited coils on the field, in inductive relation to the main coils in such manner that the induced currents in such coils may have a tendency to hold the magnetism constant.

Another cause of loss in the effective output of an alternating current machine is the self-induction of the armature coils, which increases the effective resistance, and at the same time by lagging the current decreases the magnetization of the field, and, in consequence, the electro-motive force produced. This effect we have overcome by the use of short-circuited coils wound on or in the polar faces of the field and symmetrically disposed with reference to the pairs of poles, as explained more fully in a patent granted to us July 26, 1892, No. 479,675.

Now, in order to remove the difficulties due to both the variation of the reluctance of the magnetic circuit, and the armature reaction in a more simple manner than by the two sets of short-circuited coils described, we propose to employ a non-magnetic conducting sheathing secured to and connecting the poles of the field or that portion of the machine in which it is desired to keep the magnetism constant. In the ordinary type of machine this sheathing would be in the form of a cylinder, preferably of copper, fixed to the polar faces of the field and surrounding the armature. In such other forms of machine, as in the Mordey or Siemens alternators, where the armature coils move between a series of pairs of poles, or the poles rotate on opposite sides of a series of armature coils, the sheathing would be in the form of two rings or annular disks made fast to the polar faces. This band or sheathing in whatever form it may be applied, as necessitated by the particular construction of the machine, may be regarded as constituting two superposed windings or paths for currents, one corresponding to the neutralizing or compensating coils of our patent above referred to; the other, parallel to and in inductive relation to the field coils. The function of the first is well understood, while in further explanation of the purpose of the latter it may be stated that the currents set up therein are always in such a direction as to create a magneto-motive force opposing the change of flux which, therefore, can only occur up to the point when checked by such currents.

The novel features of our invention, as we believe, are therefore: first, the combination, in a machine, one element of which is an armature formed or provided with teeth or polar projections, and the other a field the magnetism of which is not reversed in the operation of the machine, of conducting paths or circuits parallel to and in inductive relation to the field coils, however these paths be formed, provided only they are capable of checking or opposing a change of magnetic flux; second, the combination with such paths or circuits of paths in which currents may be induced by those in the armature and operate to neutralize the self-induction of the armature circuits, and third, the particular plan of providing for these two paths or circuits, by the use of the non-magnetic conducting cylinders, disks or, generally, sheathings hereinbefore described.

We have illustrated the application of our improvements to two forms of machine, and refer now to the drawings for an explanation of the details of the same.

Figure 1 is a side elevation of an ordinary type of machine composed of a frame A with field poles B, and field or energizing coils C. D is the rotating armature having recesses therein for the coils F, and hence projections or what are usually termed teeth G. E is a copper ring or cylinder which is fixed to the faces of the poles B connecting said poles and surrounding the armature. Portions of the cylinder, it will be observed, are parallel with the field coils C, and in inductive proximity thereto, while all parts are in inductive relation to the armature winding and symmetrically disposed with respect to the field.

Figure 2:
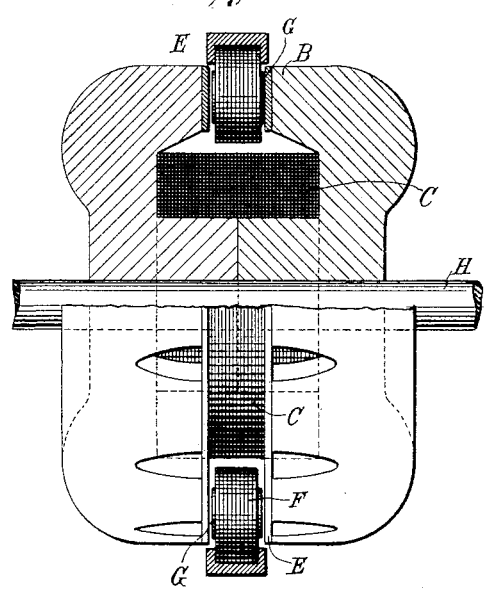

Fig. 2 is a part sectional view of a different type of machine. The field magnet in this case is mounted on a shaft H, and energized by a coil C, which is partly inclosed by the horns or polar projections B. Between the faces of these latter the armature cores D and coils F are mounted on any proper stationary support. In such machines the armature coils are usually wound on independent cores or in recesses in a magnetic ring, which produce the same result as the toothed cylinder described in Fig. 1. In these machines the conducting sheathing is in the form of two annular plates E E, fixed to the faces of the field poles, but it will be observed that the inductive relations between the disks and the armature and field coils are similar to those in the type of machine first described.

From the above illustration the manner of applying our improvements to different forms or types of machine will be understood. We have not entered into any details as to the construction of the machines or their operations as generators or motors, as these are matters which are well understood.

What we claim as our invention is—

1. In a generator or motor comprising an armature having polar projections or teeth, and a field or part in which the magnetism is constant, the combination with the said field and in inductive relation to the energizing coils thereon, of closed paths or circuits of low resistance for opposing or checking a change of magnetic flux, as set forth.

2. In a generator or motor comprising an armature having polar projections or teeth, and a field or part in which the magnetism is constant, the combination of closed paths in inductive relation to the field coils and closed paths in inductive relation to the armature coils, both fixed or made fast to the field, as set forth.

3. In a generator or motor, the combination with the field poles and an armature having polar projections or teeth, of a continuous non-magnetic conducting sheathing interposed between the armature coils and the faces of the field poles and connecting and fixed to the latter, as set forth.

4. The combination with the armature core D formed with recesses for the coils, the field poles B between which the armature is mounted, and the copper cylinder E secured to the faces of said poles, as set forth.

WILLIAM STANLEY, JR.
JOHN F. KELLY.

Witnesses:
WILLIAM B. TOBEY,
ERNEST B. CASTLE.